(No Model.)
D. F. STAMBAUGH.
MACHINE FOR MAKING COILED SPRINGS FOR BED BOTTOMS.
No. 343,928. Patented June 15, 1886.
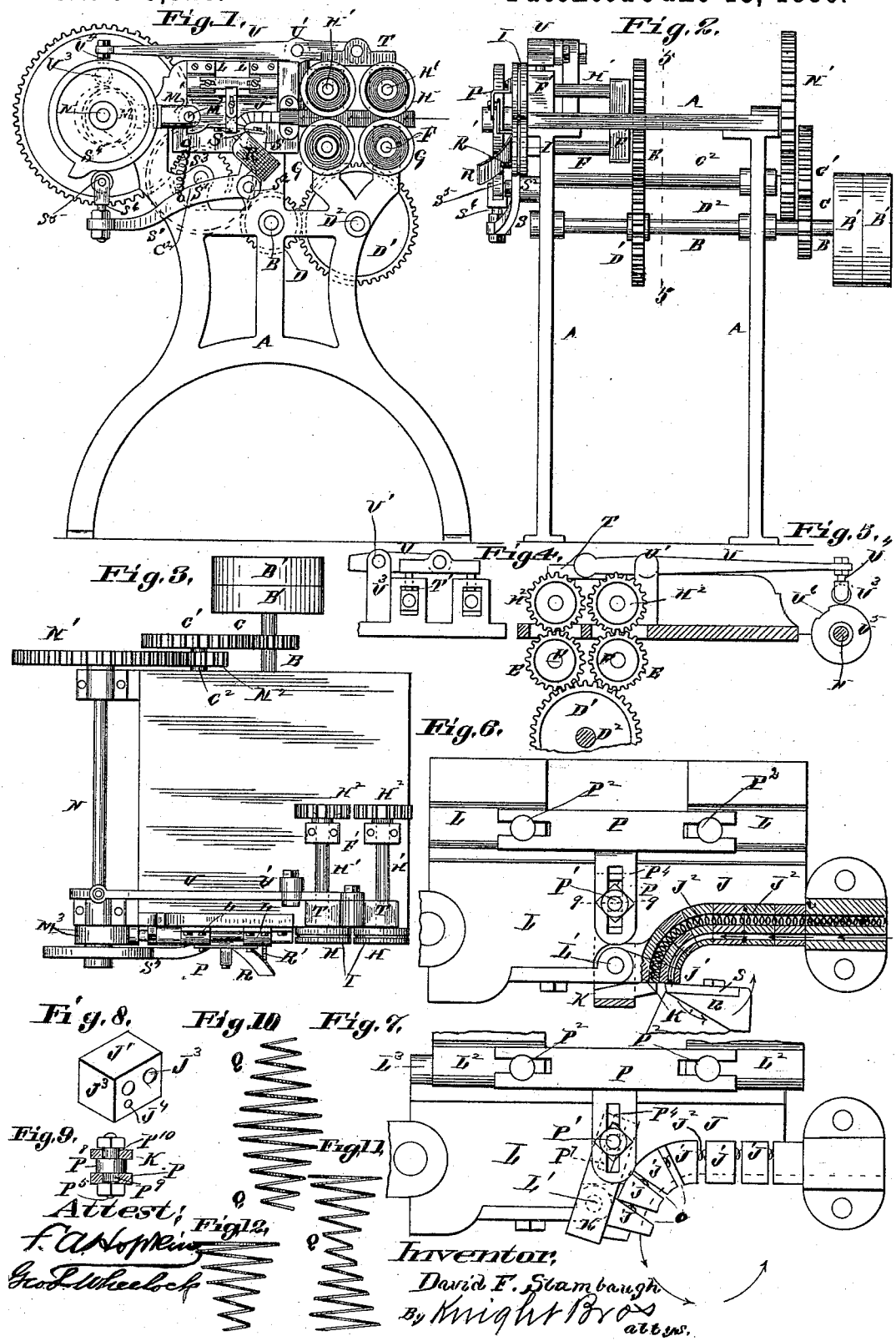

UNITED STATES PATENT OFFICE.

DAVID F. STAMBAUGH, OF ST. LOUIS, MISSOURI, ASSIGNOR OF ONE-HALF TO JAMES T. BIRCH, OF SAME PLACE.

MACHINE FOR MAKING COILED SPRINGS FOR BED-BOTTOMS.

SPECIFICATION forming part of Letters Patent No. 343,928, dated June 15, 1886.

Application filed February 13, 1886. Serial No. 191,857. (No model.)

*To all whom it may concern:*

Be it known that I, DAVID F. STAMBAUGH, of the city of St. Louis, in the State of Missouri, have invented a certain new and useful Improvement in Machines for Making Coiled Springs for Bed-Bottoms, &c., of which the following is a full, clear, and exact description, reference being had to the accompanying drawings, forming part of this specification, and in which—

Figure 1 is a side elevation of my improved machine. Fig. 2 is an end elevation. Fig. 3 is a top view. Fig. 4 is a detail inside view of the feed-roller-adjusting device. Fig. 5 is a detail vertical section taken on line 5 5, Fig. 2. Fig. 6 is an enlarged side elevation, showing the forming-finger in vertical section and in its closed position. Fig. 7 is a similar view to Fig. 6, except that the finger is shown in side elevation and in its open position. Fig. 8 shows one of the sections of the finger removed. Fig. 9 is a section taken on line 9 9, Fig. 6. Figs. 10, 11, and 12 represent springs formed by my improved machine.

My invention relates to a machine for making springs for use in bed-bottoms, &c.; and it consists in features of novelty hereinafter fully described, and pointed out in the claims.

Referring to the drawings, A represents the frame of the machine, and B the main driving-shaft, provided with tight and loose pulleys B'. The shaft B is connected by means of cog-wheels C' to a counter-shaft, $C^2$. This shaft B is also connected by means of a pinion, D, and cog-wheels D' to a shaft, $D^2$, journaled in the frame of the machine.

E, Figs. 2 and 5, represents two pinions meshing into the wheel D'. They are secured to one end of short shafts F, journaled in frames F', secured to the frame of the machine, and to the other ends of which are secured the lower feed-rolls, G. Over the feed-rolls G are located similar rolls, H, secured to the outer ends of shafts H', supported in the frames F', and having upon their inner ends pinions $H^2$, similar to and meshing into pinions E. These feed-rolls are thus driven by the cog-wheel D', and they are preferably grooved, as shown at I, Fig. 2, to receive the wire, which is passed and fed through them.

From the feed-rolls the wire passes to and through a flexible finger, J, composed of sections J', held together by spiral or other springs, $J^2$, as shown. These springs fit in holes $J^3$ in the sections, (see Fig. 8,) and the sections have a hole, $J^4$, each for the passage of the wire. As the machine is operated this finger is opened and closed from the position shown in Fig. 6 to that shown in Fig. 7. My preferred manner of accomplishing this is by connecting the outer section or sections, J', to a sliding head or plate, L, as shown at L', Figs. 6 and 7. The plate is held to the frame of the machine by brackets $L^2$, having sockets receiving ribs $L^3$ on the plate. The plate is thus free to be moved horizontally, and this movement is accomplished by means of an eccentric, M, on a shaft, N, journaled to the frame of the machine and connected by a cog-wheel, N', and pinion $N^2$ to the counter-shaft $C^2$. The connection between the plate and eccentric is made by a rod, M', made fast to the plate at $M^2$, and provided with a ring, $M^3$, that surrounds the eccentric. It will thus be understood that as the shaft N is turned the head or plate L will be moved back and forth in the direction of the length of the finger. As the plate is thus moved, it will be understood that the finger will be made to assume a more or less straight position. In addition to this movement of the finger it is necessary to open out the sections of the finger, as shown at O, so as to give greater diameter to the sections or end of the finger when the finger is open than when it is closed. For this purpose I secure the lower section, J', to a yoke or plate, K, as shown at K'. The plate is pivoted to the head L at L', and is connected at the upper end to a stationary arm, P, at P'. The arm is connected to the frame of the machine at $P^2$. The action of the yoke K moving on the pivots P' and L' is, as will be plainly understood, to open the end sections, J', of the finger at O, as the head L is moved in a direction away from the finger, and then as the head is moved back the action of the plate K is to close the sections of the finger from the position shown in Fig. 7 to that shown in Fig. 6.

When the finger is closed up, a small part, Q, of the springs is formed, and as it opens out the larger part of the springs is formed, so that as the finger opens the spring is made larger until the finger commences to close again, and then the spring is gradually reduced to its smallest diameter. The yoke or plate K should be connected to the arm P, so as to be slightly adjustable, and for this purpose the arm is slotted at P$^4$ to receive the connecting-bolt P$^5$. The object of this is to let the plate move slightly vertically as the head L is moved, which is necessitated by the lower end of the plate K not moving in the arc of a true circle, of which the point P′ would be the center. The bolt P$^5$ passes through a slot, P$^7$, in the plate K, so that by loosening the nut P$^8$ on the inner end of the bolt the pivot-point of the plate can be changed by slipping the bolt up or down to give a greater or less radius to the movement of its lower end, and in this way the diameter of the spring may be increased or diminished as the end of the finger is made to open out more or less at O. The form of the connecting-bolt is shown in Fig. 9, it having an enlargement, P$^8$, between the arm and plate, a square portion, P$^9$, that fits in the slot of the arm, and a rounded portion, P$^{10}$, that fits in the slot of the plate. As the wire passes from the finger it comes in contact with a guide-plate, R, secured to the frame of the machine, or to the knife-lever S′, and which acts in connection with the finger to form the spring. This plate should be bent downward and outward from its nearest point to the finger, as shown in Figs. 2, 3, and 6, and its inclination may be adjusted by a set-screw, R′, so as to give more or less bend to the springs, and consequently make them more or less compact with relation to their different coils, respectively. When a spring is completed, the wire is cut off by a knife, S, secured to the end of a lever, S′, pivoted at S$^2$ to the frame of the machine, and operated in one direction by a spring, S$^3$, and in the other direction by a cam, S$^4$, on the shaft N, which comes in contact with a friction-roller, S$^5$, connected by a stem, S$^6$, to the outer end of the lever. The springs S$^3$ act to restore the knife to its normal position after it has been operated by the cam S$^4$ to cut off the wire. The cam S$^4$ may be duplicated, if desired, and the knife made to operate more frequently, so as to cut off the springs at any desired point.

In the form of spring shown in Fig. 12 there would be two cams, because the wire has to be cut both when the smallest diameter of the spring is reached and when the largest diameter of the spring is reached.

When it is desired to make the form of spring shown in Fig. 11, it is only necessary to have the knife operate when the largest part of the spring is being formed, instead of when the smallest part of the spring is being formed, as shown in the spring represented in Fig. 10.

When the knife is operating, it is desired to stop the feed of the wire, and for this purpose I connect the upper feed-rolls to a frame, T, connected to the boxes of the shafts H′, which work in slots T′ of their housings, as shown in Fig. 4. To this box T is connected one end of a lever, U, pivoted at U′ to a post, U$^2$, secured to the frame of the machine. On the outer end of the lever U is secured a friction-roller, U$^3$, by a pin, U$^4$. This roller works on a collar or cam, U$^5$, secured to the shaft N, which has a depression, U$^6$. The inner end of the lever U is thus allowed to rise under the upward pressure of the feed-rolls when the roller U$^3$ comes to the depression U$^6$, and the feed at this time stops; but as soon as the roller passes out of the depression U$^6$ the feed-rolls are forced together and the feed resumes.

The springs made by my machine may be used for bed-bottoms, chairs, and upholstery works of all kinds.

I claim as my invention—

1. In a machine for making wire coils, a flexible finger, through which the wire passes, in combination with a guide against which the wire bears as it passes from the finger, for the purpose specified.

2. In a machine for making wire coils, a flexible finger, through which the wire passes, in combination with an adjustable guide, against which the wire bears as it passes from the finger, for the purpose specified.

3. In a machine for forming wire coils, a flexible finger, through which the wire is passed, in combination with feed mechanism and mechanism for opening and closing the finger, substantially as described.

4. In a machine for forming wire coils, a flexible finger, through which the wire is passed, in combination with mechanism for feeding the wire, mechanism for opening and closing the finger, and mechanism for cutting the wire off, substantially as described.

5. In a machine for forming wire coils, a finger made in sections connected by springs, through which the wire passes, in combination with the mechanism for feeding the wire, mechanism for opening and closing the finger, and mechanism for cutting the wire off, substantially as described.

6. In a machine for forming wire coils, a finger through which the wire passes made in sections connected by springs, in combination with mechanism for feeding the wire and mechanism for opening the finger by spreading its lower part out, as shown at O, substantially as described.

7. In a machine for forming wire coils, a finger through which the wire passes, composed of sections, springs connecting the sections of the finger together, mechanism for opening and closing the finger, an adjustable guide, against which the wire bears as it comes from the finger, and feed mechanism, substantially as shown and described.

8. In a machine for making coil-springs, a flexible finger, in combination with the sliding head, and pivoted plate K, for opening and closing the finger, and mechanism for feeding the wire, substantially as described.

9. In a machine for making coil-springs, a finger composed of sections connected by springs, in combination with the sliding head L and pivoted plate K, to which the finger is secured, feed mechanism, adjustable guide R, and cutter S, all arranged and operating substantially as and for the purpose set forth.

10. In a machine for making coil-springs, the combination of the feed mechanism, flexible finger, sliding head, to which one end of the finger is connected, adjustable pivoted plate K, to which one end of the finger is connected, and an adjustable guide, arranged and operating substantially as and for the purpose set forth.

11. In a machine for making wire coils, a flexible finger, through which the wire is passed, in combination with mechanism for automatically operating the finger, substantially as set forth.

DAVID F. STAMBAUGH.

In presence of—
GEO. H. KNIGHT,
EDW. S. KNIGHT.